UNITED STATES PATENT OFFICE.

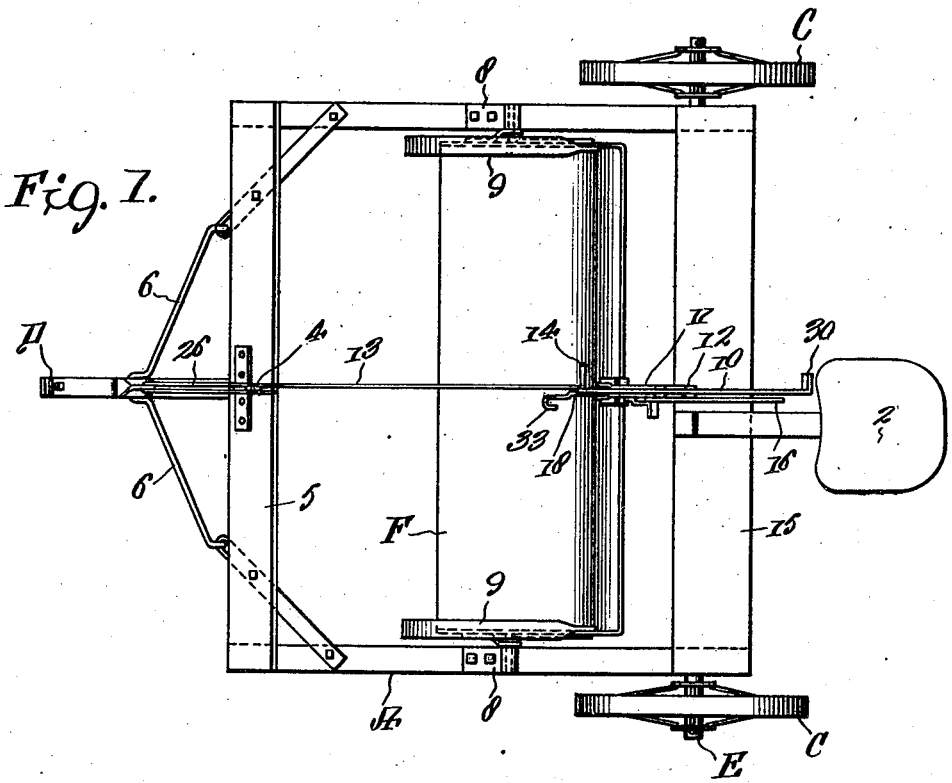

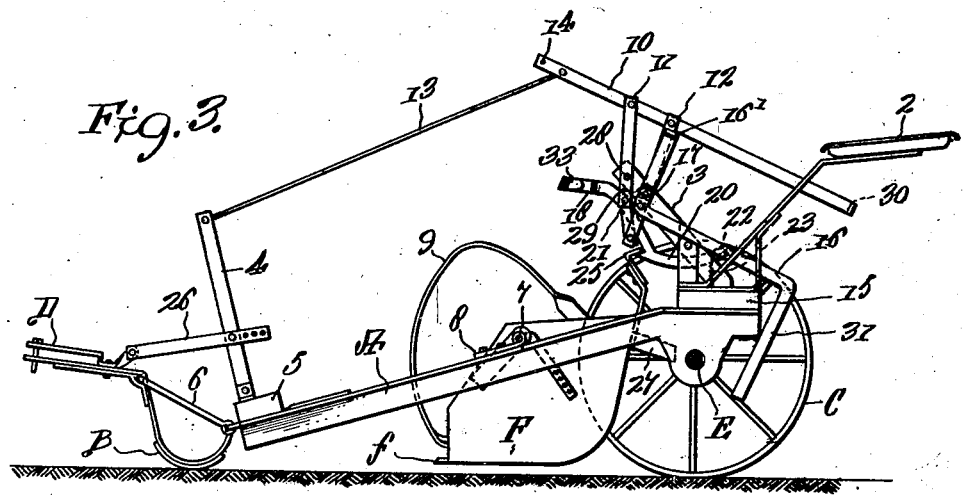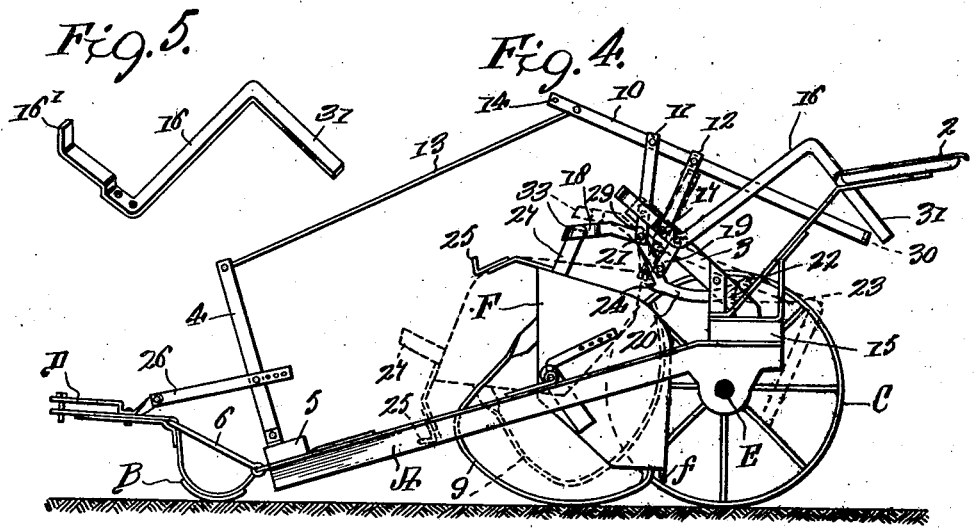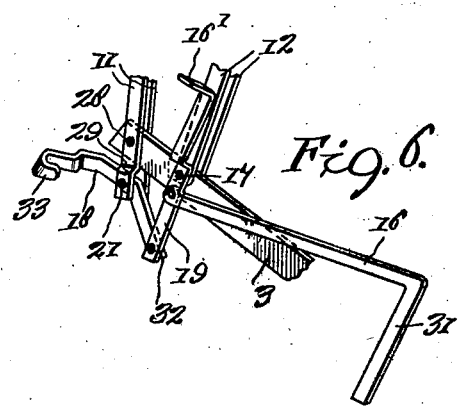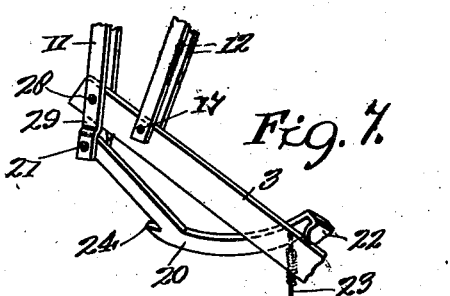

ARTHUR R. MISKIN, OF IDAHO FALLS, IDAHO.

EARTH-SCRAPER.

1,352,301.

Specification of Letters Patent.   Patented Sept. 7, 1920.

Application filed November 11, 1918. Serial No. 262,006.

*To all whom it may concern:*

Be it known that I, ARTHUR R. MISKIN, a citizen of the United States, residing at Idaho Falls, in the county of Bonneville and State of Idaho, have invented certain new and useful Improvements in Earth-Scrapers, of which the following is a specification.

My invention relates to earth scrapers and has for its object to produce a wheel supported scraper that is of easy draft, that may be easily and quickly manipulated for filling and for discharge.

I have illustrated, in the accompanying drawings, a machine embodying my present improvements without intending, however, to limit my invention in its useful applications to a machine having all the specific details of construction and arrangement shown.

In the drawings Figure 1 is a plan view of an earth scraper embodying my improvements. Fig. 2 is a side elevation of the machine, the near wheel being removed, illustrating the parts in the positions they assume when the scoop of the machine is being filled with earth. Fig. 3 is a view similar to Fig. 2 except that the parts are in the positions they occupy when the machine is in transit. Fig. 4 is a view similar to Figs. 2 and 3 except that the parts are represented in full lines in the positions assumed when the load is being discharged from the scoop and spread into a uniform layer; and in dotted lines the positions they assume when it is desired to dump the load in a heap. Fig. 5 is a detail perspective view, detached, of the foot lever 16.

Figs. 6 and 7 are detail perspective views illustrating arrangements of particular parts of the means employed for controlling the movements of the scoop.

Referring to the drawings A represents the main supporting frame of the machine, which is preferably rectangular and supported at its rear upon an axle E carrying a pair of wheels C. Pivoted to the front crossbar 5 of the main frame is an adjustable runner B arranged to engage with the surface of the ground and to hold the front portion of the frame at the desired height. A scoop F is mounted within the frame A, being supported so that it may revolve upon its supports to facilitate loading and discharging. It is provided at its side with trunnions 7 mounted in bearings 8 carried by the side pieces of the frame and these are located preferably a little to the rear of the central transverse line of the frame. The scoop is provided with a pair of runners 9 secured to its end walls. The curved portions of the runners that engage with the surface of the ground are so shaped and have such radius that they operate to hold the cutting edge *f* of the scoop from contact with the ground when the scoop is inverted for discharging its load, the curve of the runner being irregular, the portion thereof nearest the edge *f* of the scoop being farthest from the axis about which the scoop F swings and thence gradually approaching such axis.

D represents a clevis through which draft to move the machine is applied, this being preferably pivotally united with the front runner B and also connected with the main frame through draft bars 6.

A driver's seat 2 is supported upon the rear cross-piece 15 of the frame, from which also arises the standard 3 that constitutes a support for parts that will be presently described. Pivotally supported by the front crosspiece of the frame is an upright lever 4 that is adjustably connected, by a link 26, with the front runner B. The upper end of the lever 4 is connected by a link 13 with the operating lever 10 located in position to be conveniently manipulated by the driver while occupying the seat 2. I have shown the lever 10 as being provided at its upper end with a handpiece 14 and at its lower end with footpiece 30. The lever 10 is double fulcrumed, being pivotally connected with the upper ends of the fulcrum bars 11 and 12 that unite it with the standard 3. These connections give to the operating lever 10 a bodily movement to the rear whenever the upper end thereof is drawn backward, as represented in Fig. 2, in order to lift the front runner B and allow the front end of the frame to fall in order to bring the scraper toward the surface of the ground and into working position.

The front fulcrum bar 11, which is pivoted to the standard 3 at 28, is continued beyond its pivot, as at 29, and has pivotally united to this extension, at 21 near the lower end thereof, a bent lever 18. The forward, upper end of this lever is preferably shaped into a hook 33, and to its lower rear end is pivoted a link 19, uniting the lever with a foot lever 16, to be later described. Upon the pivot 21, uniting the lower end of the fulcrum bar 11 and the lever 18, is pivotally hung a latchpiece 20 that is formed with an intermediate catch 24, adapted to engage below with a hook 25 secured to the rear portion of the scoop F. The latchpiece is formed with a rearward extension to which is connected a spring 23, tending to hold the latch in position to engage with the hook 25, and at its rear end is preferably formed a hook 22 adapted to engage with the standard 3 and limit the extent to which the latch may be moved by the spring. The shape and disposition of the lever 18 are such that its lower end normally lies above the catch 25, which thus occupies a sort of pocket between this end of the lever 18 and the hook 24 of the catchpiece 20, the scoop being thus held steady and against rotation upon its trunnions.

The foot lever 16 is pivotally united with the standard 3, preferably by the same bolt 17 that connects the fulcrum bar 12 to the standard. This lever is provided at its upper end with a footpiece 16' and its rear end is weighted so as to normally throw the upper end of the lever toward the rear. The lever is preferably approximately Z-shaped when considered from the side of the machine, the fulcrum 17 being located between the ends of the bar that constitutes the upper bar of the Z, and the link 19 uniting this foot lever with the lever 18 being pivotally connected at about the angle where the members corresponding to the upper bar and intermediate bar of the letter Z unite. The rearward portions of the lever, corresponding with the lower part of the letter constitute the weight, and are designated 31. This weighted part of the lever extends over the rear crosspiece of the frame A and engages therewith, thus limiting the extent to which the end of the lever carrying the footpiece may move to the rear. This weighted end is also adapted to engage with the seat 2, or the standard thereof, when raised, thus limiting the extent to which the lever may be moved by the foot of the operator. When the upper end of the lever is pressed forward the link 19 connected with the lever, below the pivot 17 thereof, is drawn toward the rear. This rocks the lever 18 and carries its lower abutment end 32, away from the hook 25, thus freeing it on one side so that the scoop may be turned over for discharging, as will be described.

The operation of the machine may be now described. In Fig. 3 is represented the machine with its parts in the positions they occupy when the machine is in transit. The runner B is in engagement with the surface of the ground, holding the front end of the frame at such height that the bottom of the scoop, is approximately parallel with the surface of the ground, being a little above this surface or so that its under side bears lightly upon the ground. It is held in this position by the hook 24 of the latchpiece 20 and the abutment end of the lever 18, between which parts lies the hook 25 carried by the scoop.

When it is desired to load the scoop, the parts are brought to the positions indicated in Fig. 2. This is accomplished by pulling to the rear the upper end of the lever 10, which may be accomplished by the operator using either the handpiece 14 at the upper end of the lever or the foot piece 30 at the lower end thereof. The rocking of the operating lever inclines the lever 4 toward the rear and this, through the link 26, lifts the runner B permitting the forward end of the frame to drop somewhat, carrying the scoop as a whole toward the ground. At the same time, the scoop F is turned slightly upon its trunnions in order to present its forward cutting edge f to the ground at the proper angle to engage with the soil and lift it into the scoop. This tilting of the scoop is caused by reason of the fact, already stated, that the lower end of the fulcrum bar 11, which is caused to swing on its fulcrum when the operating lever 10 is moved, is moved upward and toward the front. This lifts both the lever 18 and the latchpiece 20 without disturbing their relations sufficiently to release the hook 25, thus effecting a positive tilting of the scoop into proper position for digging at the same instant that it is carried into engagement with the soil. The forward movement of the machine now causes the scoop to take up the soil and to become filled. When full the parts are raised to the position indicated in Fig. 3 by shifting the lever 10 from the position of Fig. 2 to that of Fig. 3. The machine is now filled and in position for transit to the place where the load is to be discharged. To effect the discharge the operator presses upon the upper end of the lever 16 and moves it into the position indicated in Fig. 4, or sufficiently far to effect the release of the hook from the confining abutment 32. This is effected by reason of the connection, through link 19, between the levers 16 and 18. The scoop being now free from restraint in one direction will turn on its trunnions into the position indicated in Fig. 4 by the forward movement of the machine. This turning of the scoop to cause discharge can largely be accomplished without lowering the forward end of the frame to bring the bottom of the scoop into engagement with the soil, for the reason that under normal working conditions the bottom of the scoop when loaded rests lightly upon the surface of the ground, and this engagement offers sufficient resistance to cause the turning of the scoop as the machine is drawn bodily forward. As the scoop rotates the runners 9 come into engagement with the earth, and being of the volute shape shown they operate to lift the scoop from the ground sufficiently to facilitate the free discharge of its contents. If it be desired to spread the load, depositing it in a uniform, thin layer, instead of in a heap, the operator maintains the foot lever 16 in the position represented in Fig. 4 during the discharging and spreading operation. The tilting of the lever 18 to carry its lower abutment end 32 out of the path of the catch 25 carried by the scoop at the same time moves the forward hook end 33 thereof into position to engage with a piece 27 carried by the scoop. This engagement stops the rotation of the scoop in the position indicated in full lines in Fig. 4, that is with the bottom of the scoop substantially vertical, the proper position for spreading the load. If, however, it be desired to dump the load in a heap, the operator releases the lever 16 as soon as the scoop has begun to operate and the hookpiece 25 has passed beyond the position occupied by the restraining or abutment end 32 of the lever 18. The lever 16 and the parts it moves then come back to normal positions, such as indicated in Figs. 2 and 3, by reason of the weighted end of the lever 16, and when the parts are thus restored to normal positions the hooked end 33 of the lever 18 is out of the path of the piece 27, so that the scoop may turn, resting on the runners 9, until it comes to the position indicated in dotted lines, Fig. 4, when it will deposit its load in a heap, where it is arrested by the bottom of the cutting edge of the scoop coming into engagement with the abutment end 32 of the lever 18. In this inverted position the machine may be moved to the place where it is again to be filled, when by operating the foot lever 16, the scoop will be released and automatically come to filling position, when the operations described may be repeated.

What I claim is:

1. In an earth scraper the combination of a frame supported at its rear by wheels, adjustable means resting on the ground for supporting the front of the frame so that such portion may be held at various distances from the surface of the ground accordingly as said means are adjusted, a scoop pivotally supported in the frame between its front and rear portions, means for holding the scoop against rotation and means connected with the said holding means and also with the said adjustable supporting means for simultaneously operating these to release the scoop to permit it to turn over after discharging and at the same time to cause the frame to be adjusted relative to the ground and to bodily move the scoop to allow it to turn over.

2. In an earth scraper the combination of a supporting frame, a scoop pivotally mounted therein, an adjustable runner bearing upon the ground for supporting the front end of the frame, a lever arranged to be operated by the driver of the machine for adjusting the runner, and connections between the said lever and the scoop arranged to cause the scoop to be tilted on its axis whenever said runner is adjusted.

3. In an earth scraper the combination of a supporting frame a scoop pivotally mounted therein, two levers under the control of the operator supported by the frame, a lever connected with one of the operating levers and arranged to positively prevent turning of the scoop in a direction to discharge its load and to be adjusted when the operating lever with which it is connected is adjusted in order to vary the angular position at which the scoop is held by it and connection between the second operating lever and the said scoop-restraining lever whereby it may be at will withdrawn from restraining relationship with the scoop, leaving the latter free to turn for discharge.

4. In an earth scraper, the combination of a supporting frame a scoop pivotally mounted therein, a pair of independent pivotally supported members for restraining the scoop from turning on its pivotal supports, one acting to restrain movement in one direction and the other in the opposite direction, means for adjusting the said restraining means together to cause the desired tilting of the scoop, and means for withdrawing one of the said devices from restraining relation with the scoop to permit the latter to be turned for discharge.

5. In an earth scraper the combination of a wheel supported frame; a scoop trunnioned on said frame; a runner hinged to the front of said frame; an upright lever connected with said runner to move it on its hinge; a double fulcrumed lever detachably connected with the back of said scoop; and a link rod connecting said levers whereby when the said double fulcrumed foot lever is operated to raise the back of said scoop the said upright lever will lower the cutting edge of the scoop.

6. In a scraper the combination of a wheel supported frame; a scoop trunnioned on said frame; a runner hinged to the front of said frame; a foot lever detachably connected with the back of said scoop; means to connect said foot lever with the free end of said runner to move said runner on its hinge when said foot lever is operated; another foot lever to disconnect the first mentioned foot lever from said loop to allow said scoop to rotate on its trunnions and dump when filled with earth.

7. In an earth scraper, the combination of a supporting frame, a scoop supported therein so as to turn for loading and discharging purposes, a stop to prevent turning of the scoop in a direction to discharge its load, a catch for holding the scoop from turning in the opposite direction, means for simultaneously adjusting the stop and catch at will to effect a limited tilting of the scoop to cause it to assume loading position, and means for causing an independent movement of the stop to release the scoop to permit it to turn for the purpose of discharge.

8. In an earth scraper, the combination of a supporting frame, a scoop supported therein so as to turn for loading and discharging purposes, a movable stop to prevent the turning of the scoop in a direction to permit discharge of its contents, the stop having two parts one for arresting the scoop when in position to retain its load, and another to arrest it in the position to discharge its load, and means for shifting the said stop and causing the first said arresting part to move to free the scoop and to simultaneously bring the other said arresting part into position to stop the turning of the scoop when it comes to discharging position.

9. The combination stated in claim 8, including as the means for shifting the stop, a weighted lever, the weight serving to automatically restore the parts to normal position with the first named arresting part of the stop in position to hold the scoop when it comes to load-retaining position.

In testimony whereof I have affixed my signature.

ARTHUR R. MISKIN.